(12) United States Patent
Shiga

(10) Patent No.: US 8,031,418 B2
(45) Date of Patent: Oct. 4, 2011

(54) LENS DRIVING MECHANISM AND IMAGE PICKUP APPARATUS USING THE SAME

(75) Inventor: Naoto Shiga, Saitama (JP)

(73) Assignee: Tamron Co., Ltd., Saitama (JP)

( * ) Notice: Subject to any disclaimer, the term of this patent is extended or adjusted under 35 U.S.C. 154(b) by 108 days.

(21) Appl. No.: 12/423,558

(22) Filed: Apr. 14, 2009

(65) Prior Publication Data

US 2009/0257139 A1    Oct. 15, 2009

(30) Foreign Application Priority Data

Apr. 14, 2008    (JP) .................................. 2008-105056

(51) Int. Cl.
*G02B 7/02*    (2006.01)
(52) U.S. Cl. ....................................................... 359/824
(58) Field of Classification Search .................. 359/696, 359/704, 824; 310/311
See application file for complete search history.

(56) References Cited

U.S. PATENT DOCUMENTS 7,671,510 B2 * 3/2010 Kawamura et al. ...... 310/316.01
2006/0113868 A1   6/2006 Sakatani et al.

FOREIGN PATENT DOCUMENTS

JP    2006071942 A    3/2006
JP    2006158054 A    6/2006

* cited by examiner

*Primary Examiner* — Joseph P Martinez
(74) *Attorney, Agent, or Firm* — The Webb Law Firm

(57) ABSTRACT

A lens driving mechanism for an image pickup apparatus capable of being reduced in size, and having excellent driving accuracy and tranquility is provided. The lens driving mechanism is characterized in that vibration of a piezoelectric vibration motor is used as a driving source, and the vibration is transmitted to a motor power transmission ring directly or via a gear structure, to rotationally drive a lens driving ring. In a first lens driving mechanism, the motor power transmission ring is rotated by rotating the first transmission gear by use of the vibration of the piezoelectric vibration motor. In a second lens driving mechanism, a thrust bearing is provided on a gear side for rotating the motor power transmission ring, and the gear is rotated by vertically pressing a vibrator of the piezoelectric vibration motor in an urged state against a plane of the gear. In a third lens driving mechanism, the lens driving ring is rotationally driven by directly pressing a vibrator of each of one or more piezoelectric vibration motors in an urged state against the outer periphery of the lens driving ring.

19 Claims, 11 Drawing Sheets

A-A'

B-B'

B-B'

B-B'

D-D'

LENS DRIVING MECHANISM AND IMAGE PICKUP APPARATUS USING THE SAME

BACKGROUND OF THE INVENTION

1. Field of the Invention

The present invention relates to a lens driving mechanism of an image pickup apparatus, and an image pickup apparatus using the lens driving mechanism

2. Description of the Related Art

In recent image pickup apparatuses such as cameras, auto-focus mechanisms capable of freely changing a focal length at the time of picking up images within a given range are employed. There is an increasing demand for the image pickup apparatuses to have a higher magnification and larger aperture. Generally, in the auto-focus mechanisms, at least either mechanical compensation in which movement of a focal plane is compensated for by nonlinear movement of a lens group using a cam, or optical compensation in which a focal plane is designed to remain constant even after zooming is effected by calculating an optical power balance is employed and is used in combination with electronic compensation in which movement of a focal plane is compensated for by using an auto-focus function of the image pickup apparatus. This is because the focal plane movement of a zoom lens having a high magnification and large aperture is difficult to compensate for to a sufficient level by using only the mechanical compensation or the optical compensation.

As shown in FIGS. 13 and 14, in a lens driving mechanism of a conventional image pickup apparatus, a driving force is transmitted from the end of a rotating shaft of a DC motor 61 to a first drive gear 62 via belt drive, and a rotor 70 connected to a motor power transmission ring 67 is rotated via multiple clutch gears 63. Accordingly, a lens driving ring 68 mounted on the inside of the motor power transmission ring 67 is rotationally driven.

For example, a lens frame driving apparatus disclosed in Japanese Patent Laid-Open No. 2006-71942 as a lens driving mechanism includes: at least one vibrator for generating elliptical vibration composed of bending standing-wave vibration and longitudinal vibration; an electrically-driven member linearly driven in an optical axis direction relative to the vibrator by the action of the elliptical vibration of the vibrator; a manually-driven member provided movably in the optical axis direction in accordance with manual operation; and a driven member in which a rolling element in pressure contact with the outer surface of the electrically-driven member and the inner surface of the manually-driven member to be rollable in the optical axis direction is disposed, and which is linearly moved in the optical axis direction along with the rolling element that rotates to move in response to the relative movement of the electrically-driven member and the manually-driven member in the optical axis direction.

In a vibration wave motor and a lens barrel disclosed in Japanese Patent Laid-Open No. 2006-158054, a lens in a lens barrel is drive-controlled by a vibration wave motor for bringing at least one vibrator including a driving element excited to perform elliptical vibration, and a node of vibration into frictional contact with a contact surface provided perpendicular to a rotation axis direction in a rotor supported to rotate about the rotation axis, and rotationally driving the rotor, the vibration wave motor including a support member, a guide support portion formed in the support member, the guide support portion supporting the vibrator substantially at the node of vibration while restricting movement of the vibrator in a direction perpendicular to the rotation axis and a circumferential direction and enabling linear movement of the vibrator along the rotation axis direction, and an urging member arranged in the support member, the urging member urging the vibrator in the rotation axis direction of the rotor so as to be in contact with the contact surface, wherein the vibrator, the rotor, the support member, and the urging member are integrated into a unit to form the vibration wave motor.

However, conventionally, in the lens driving mechanism as shown in FIGS. 13 and 14, multiple gears need to be arranged between the rotating shaft of the DC motor 61 and the motor power transmission ring 67. Thus, there is a limit in ensuring the driving accuracy and downsizing as the lens driving mechanism, and it is difficult to further reduce the size of the lens driving mechanism. The lens driving mechanism also has a disadvantage that it lacks tranquility with the driving sound of the gears at the time of rotation being loud since each gear of the multiple gears is set with a given reduction ratio.

A lens frame apparatus in which the lens frame driving apparatus disclosed in Japanese Patent Laid-Open No. 2006-71942 is incorporated includes an ultrasonic actuator mounted on a fixed frame via a mounting plate. A movable frame with which the vibrator of the ultrasonic actuator is in pressure contact is fitted to the outer peripheral portion of the fixed frame in a forward/backward movable manner. A driven frame is fitted to the outer peripheral portion of the movable frame, and an outer frame is fitted to the outer peripheral portion of the driven frame respectively in a forward/backward movable manner. A roller is incorporated in the driven frame in a state of pressure contact with the movable frame and the outer frame. When the movable frame is electrically driven by the actuator, the driven frame is forwardly/backwardly driven via the roller in accordance with the forward/backward movement of the movable frame. On the other hand, when the outer frame is forwardly/backwardly driven by manual operation, the driven frame is forwardly/backwardly driven via the roller in accordance with the forward/backward movement of the outer frame. The technique disclosed in Japanese Patent Laid-Open No. 2006-71942, however, has a problem that it is not possible to increase the aperture size of a lens incorporated within a lens frame, and reduce the size of the lens frame at the same time since the ultrasonic actuator is mounted inside the lens frame.

The vibration wave motor disclosed in Japanese Patent Laid-Open No. 2006-158054 includes a housing, a rotor, a bearing member, a vibrator serving as an actuator and having a support shaft and a driving element, and a leaf spring having a pressing protrusion. The vibrator is slidably disposed in an opening of the housing along the rotation axis direction with the support shaft being supported in a rotatable manner. The vibrator is held while being urged by the leaf spring and being in contact with the rotor. The vibrator is excited to generate supersonic vibration so that the rotor is rotated. Since the vibrator is movably supported by the housing in the rotation axis direction and the vibrator is urged by the leaf spring and is in contact with a friction contact surface of the rotor, the vibrator is evenly in contact with the rotor in a direction perpendicular to the friction contact surface so as to provide superior driving conditions of the vibration wave motor. That is, in the lens barrel of Japanese Patent Laid-Open No. 2006-158054, the vibrator is rotated in contact with the rotor as a plane perpendicular to an optical axis in the lens barrel, to thereby drive the lens barrel by use of the torque. The technique, however, has a problem that the driving accuracy is relatively low as compared with a case of directly driving the lens barrel since the lens barrel is driven via a predetermined power transmission mechanism.

Accordingly, there has been a demand for a lens driving mechanism for an image pickup apparatus capable of being reduced in size, and having excellent driving accuracy and tranquility.

SUMMARY OF THE INVENTION

The present inventors have intensively studied and, as a result, succeeded in solving the aforementioned problems by employing a lens driving mechanism as described below and an image pickup apparatus using the lens driving mechanism. The present invention will be outlined below.

A lens driving mechanism according to the present invention is a driving mechanism for transmitting power generated from a driving source to a motor power transmission ring housed in a lens barrel, and thereby rotationally driving a lens driving ring attached to the motor power transmission ring, wherein vibration of a piezoelectric vibration motor is used as the driving source, and the vibration is transmitted to the motor power transmission ring directly or via a gear structure, to rotationally drive the lens driving ring. The following lens driving mechanisms are based on the above basic technical idea. In the following, the lens driving mechanism is roughly divided into a "first lens driving mechanism", a "second lens driving mechanism", and a "third lens driving mechanism".

First lens driving mechanism: The first lens driving mechanism according to the present invention is a lens driving mechanism for transmitting the vibration of the piezoelectric vibration motor as the driving source to the motor power transmission ring via a gear structure, and thereby rotationally driving the lens driving ring, wherein the gear structure includes: a through hole provided in a wall extending parallel to the motor power transmission ring; a rotor shaft penetrating through the through hole; a first transmission gear provided on one end side of the rotor shaft projecting outside the wall; and a toothed gear provided on the other end side of the rotor shaft that is on the motor power transmission ring side, the toothed gear transmitting a driving force to a gear meshing portion formed on an inner periphery of the motor power transmission ring; and by rotating the first transmission gear by use of the vibration of the piezoelectric vibration motor, the rotor shaft is rotated and the toothed gear on the other end side is also rotated, to thereby rotate the motor power transmission ring.

Second lens driving mechanism: The second lens driving mechanism according to the present invention is a lens driving mechanism for transmitting the vibration of the piezoelectric vibration motor as the driving source to the motor power transmission ring via a gear structure, and thereby rotationally driving the lens driving ring, wherein the gear structure includes: a through hole provided in a wall extending parallel to the motor power transmission ring; a rotor shaft penetrating through the through hole; a transmission gear provided on one end side of the rotor shaft projecting outside the wall; a toothed gear provided on the other end side of the rotor shaft that is on the motor power transmission ring side, the toothed gear transmitting a driving force to a gear meshing portion formed on an inner periphery of the motor power transmission ring; a thrust bearing provided on the transmission gear side; and a bearing provided on the toothed gear side; a vibrator of the piezoelectric vibration motor is vertically pressed in an urged state against a plane of the transmission gear projecting outside the wall, the transmission gear is directly rotated by the vibration of the piezoelectric vibration motor, and by torque thereof, the rotor shaft is rotated and the toothed gear on the other end side is also rotated, to thereby rotate the motor power transmission ring.

In such a case, a magnet mechanism is preferably provided around the transmission gear to perform stable operation by pressing the transmission gear against the thrust bearing.

Also, a spring mechanism is preferably provided around the transmission gear to perform stable operation by pressing the thrust bearing against the transmission gear.

In the first or second lens driving mechanism according to the present invention described above, an encoder wheel rotating in synchronization with rotation of the transmission gear is preferably provided outside the wall.

The transmission gear in the first or second lens driving mechanism according to the present invention is preferably made of ceramic material.

Also, the transmission gear in the first or second lens driving mechanism according to the present invention is preferably made of stainless-steel material having a hardness of HV900 or more.

Third lens driving mechanism: The third lens driving mechanism according to the present invention is a lens driving mechanism for directly transmitting the vibration of the piezoelectric vibration motor as the driving source to the lens driving ring connected to the motor power transmission ring, and thereby rotating the motor power transmission ring and the lens driving ring in synchronization, wherein one or more piezoelectric vibration motors are arranged on an outer periphery of the lens driving ring with a vibrator of each of the piezoelectric vibration motors being directly pressed in an urged state against the outer periphery.

In the third lens driving mechanism, one or more guide rollers are preferably provided on the outer periphery of the lens driving ring, to adjust a center position of the lens driving ring against which the vibrator of each of the piezoelectric vibration motors is pressed in an urged state.

By using the lens driving mechanism described above, an image pickup apparatus having an excellent imaging quality can be provided.

The lens driving mechanism according to the present invention transmits the vibration of the piezoelectric vibration motor as the driving source to the motor power transmission ring directly or via the gear structure, to thereby rotationally drive the lens driving ring. Accordingly, a distance from the driving source to the motor power transmission ring is shortened, and drive errors are reduced. The lens driving mechanism can be reduced in size and the driving sound thereof can be made quiet. Furthermore, since the plurality of piezoelectric vibration motors may be used, the lens driving mechanism which provides high torque and high-speed drive can be provided. Accordingly, the image pickup apparatus using the lens driving mechanism can be provided with a high-quality auto-focus function.

DETAILED DESCRIPTION OF THE PREFERRED EMBODIMENTS

A lens driving mechanism according to the present invention is a driving mechanism for transmitting power generated from a driving source to a motor power transmission ring housed in a lens barrel, and thereby rotationally driving a lens driving ring attached to the motor power transmission ring, wherein vibration of a piezoelectric vibration motor is used as the driving source, and the vibration is transmitted to the motor power transmission ring directly or via a gear structure, to rotationally drive the lens driving ring. The lens driving mechanism is roughly divided into a "first lens driving mechanism", a "second lens driving mechanism", and a "third lens driving mechanism", which will be described below with reference to the drawings.

First lens driving mechanism: The first lens driving mechanism according to the present invention is a lens driving mechanism for transmitting the vibration of the piezoelectric vibration motor as the driving source to the motor power transmission ring via a gear structure, and thereby rotationally driving the lens driving ring. In the gear structure, a through hole is provided in a wall extending parallel to the motor power transmission ring. A rotor shaft penetrates through the through hole. A first transmission gear is provided on one end side of the rotor shaft projecting outside the wall, and a toothed gear for transmitting a driving force to a gear meshing portion formed on the inner periphery of the motor power transmission ring is provided on the other end side of the rotor shaft that is on the motor power transmission ring side. By rotating the first transmission gear by use of the vibration of the piezoelectric vibration motor, the rotor shaft is rotated and the toothed gear on the other end side is also rotated. The motor power transmission ring is thereby rotated.

Figure 1:
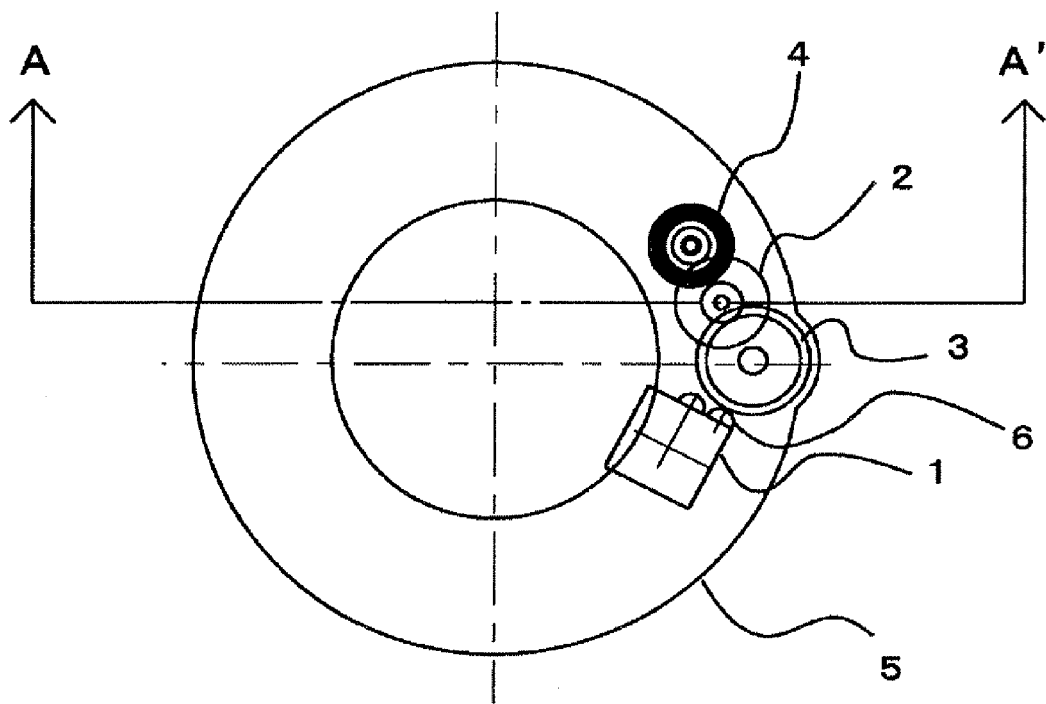
FIG. 1 is a plan view showing an embodiment of a first lens driving mechanism according to the present invention.
Figure 2:
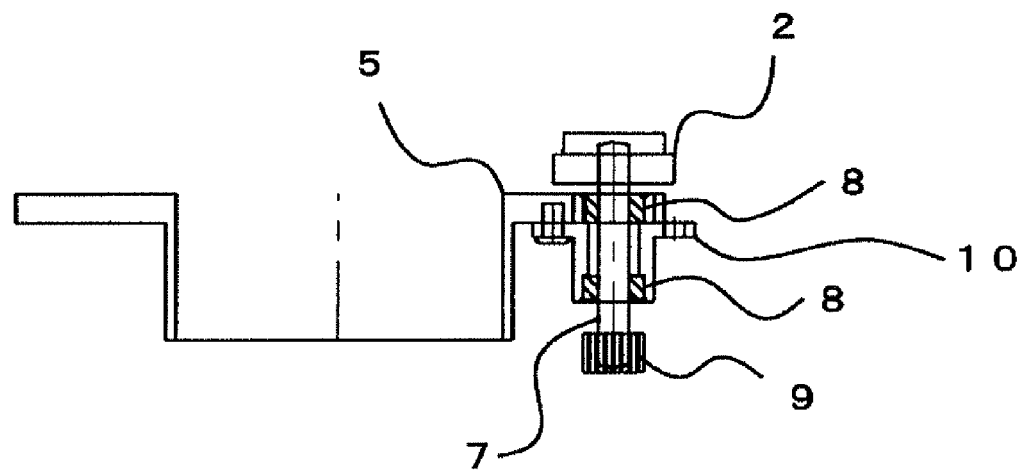
FIG. 2 is a sectional view taken along a line A-A' of the first lens driving mechanism shown in FIG. 1.

The first lens driving mechanism will be described in further detail below with reference to FIGS. 1 and 2. FIG. 1 is a schematic view showing the arrangement of a piezoelectric vibration motor 1, a first transmission gear 2, a second transmission gear 3, and an encoder wheel 4, which are arranged on a wall 5. FIG. 2 is a sectional view taken along a line A-A' in FIG. 1.

As shown in FIG. 1, in the gear structure of the first lens driving mechanism, a vibrator 6 of the piezoelectric vibration motor is in contact with the outer peripheral surface of the second transmission gear 3 for rotating the first transmission gear 2 at double speed or reduced speed, and the second transmission gear 3 and the encoder wheel 4 are arranged meshing with each other via the first transmission gear 2. As shown in FIG. 2, the first transmission gear 2 and a toothed gear 9 are respectively coupled to one end side and the other end side of a rotor shaft 7 with the wall 5 therebetween. The rotor shaft 7 is engaged in a state of being inserted into a through hole extending through the wall 5 and a rotor shaft housing guide 10 integrally formed with the wall 5. With the vibrator 6 of the piezoelectric vibration motor being pressed in an urged state against the outer peripheral surface of the second transmission gear 3, the second transmission gear 3 is rotated by the vibration generated by the piezoelectric vibration motor 1. The first transmission gear 2 and the encoder wheel 4 are thereby rotated. Here, the second transmission gear 3 includes a gear pitch for doubling or reducing the rotation speed of the first transmission gear 2, so that the driving speed and moving accuracy of a lens can be adjusted.

In the first lens driving mechanism according to the present invention, a through hole having a bearing therein is preferably employed as the through hole of the wall 5. As shown in FIG. 2, bearings 8 are provided in the wall 5 and the rotor shaft housing guide 10. By providing the bearings 8, wobble of the rotor shaft during rotation can be effectively prevented. In the first lens driving mechanism according to the present invention, when the second transmission gear 3 is rotated, the toothed gear 9 formed on the other end side of the rotor shaft 7 is rotated, and the motor power transmission ring meshing with the toothed gear 9 is also rotated. Accordingly, the lens driving ring is rotationally driven.

Figure 3:
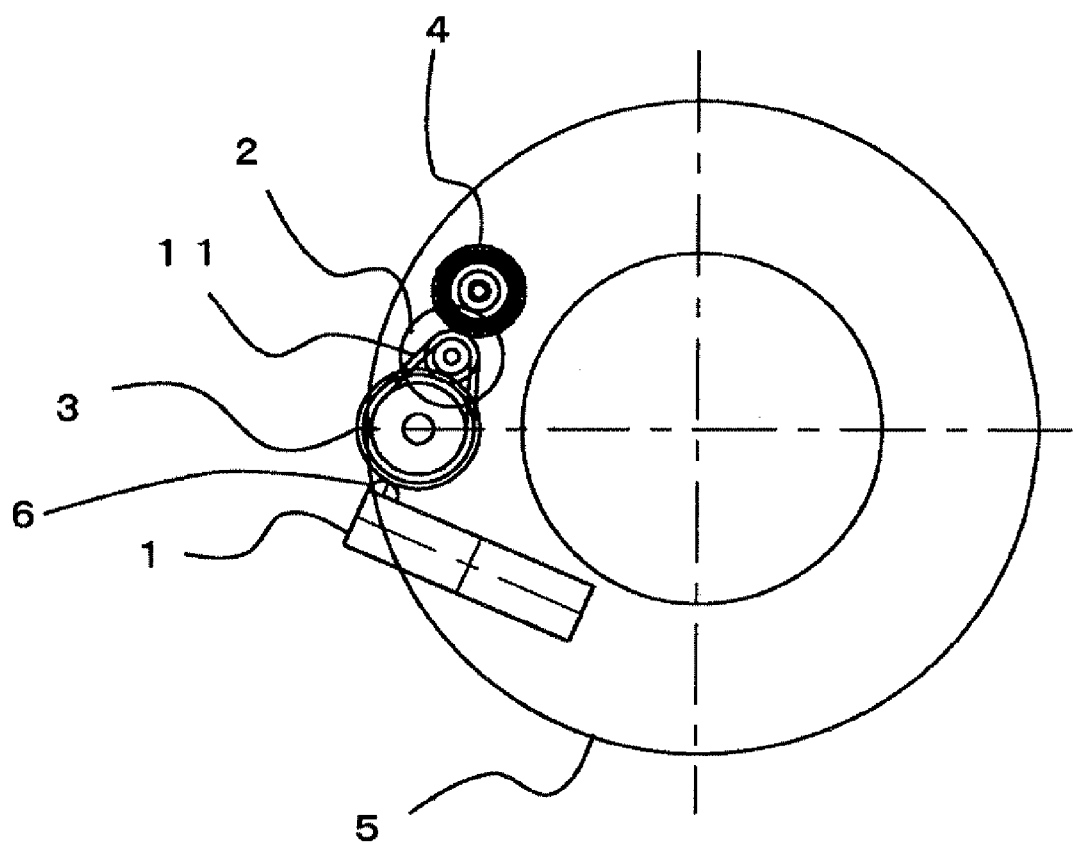
FIG. 3 is a plan view showing another embodiment of the first lens driving mechanism according to the present invention.

FIG. 3 shows another embodiment of the first lens driving mechanism according to the present invention. FIG. 3 shows an example in which the vibrator 6 of the piezoelectric vibration motor 1 that is horizontally placed is arranged in contact with the outer peripheral surface of the second transmission gear 3, and the first transmission gear 2 and the second transmission gear 3 are connected via a transmission belt 11. When the first lens driving mechanism according to the present invention is used for an image pickup apparatus, the arrangement of parts and power transmission means used in the lens driving mechanism can be appropriately changed according to the layout of other parts constituting the image pickup apparatus.

The first lens driving mechanism according to the present invention is not limited to the embodiments shown in the drawings. For example, the configuration shown in FIG. 1 and the configuration shown in FIG. 3 may be arranged on the same wall.

Second lens driving mechanism: The second lens driving mechanism according to the present invention is a lens driving mechanism for transmitting the vibration of the piezoelectric vibration motor as the driving source to the motor power transmission ring via a gear structure, and thereby rotationally driving the lens driving ring. In the gear structure, a through hole is provided in a wall extending parallel to the motor power transmission ring. A thrust bearing is provided on a transmission gear side, and a bearing is provided on a toothed gear side inside the through hole. A rotor shaft penetrates through the through hole. A transmission gear is provided on one end side of the rotor shaft projecting outside the wall, and a toothed gear for transmitting a driving force to a gear meshing portion formed on the inner periphery of the motor power transmission ring is provided on the other end side of the rotor shaft that is on the motor power transmission ring side. A vibrator of the piezoelectric vibration motor is vertically pressed in an urged state against a plane of the transmission gear projecting outside the wall. The transmission gear is directly rotated by the vibration of the piezoelectric vibration motor. By the torque, the rotor shaft is rotated and the toothed gear on the other end side is also rotated. The motor power transmission ring is thereby rotated.

Figure 4:
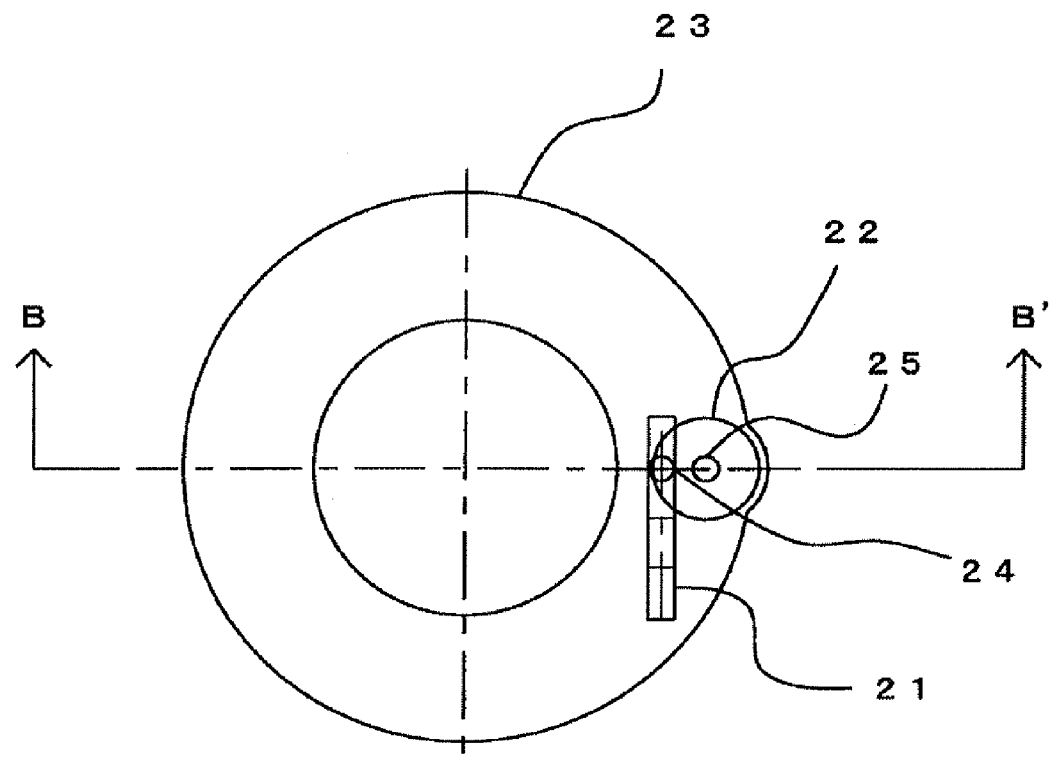
FIG. 4 is a plan view showing an embodiment of a second lens driving mechanism according to the present invention.
Figure 5:
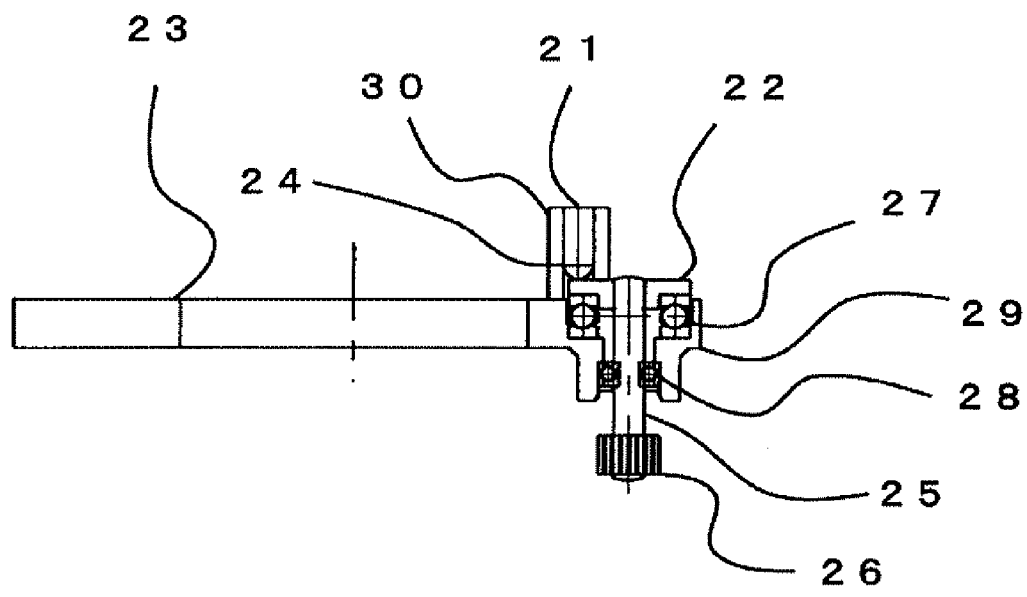
FIG. 5 is a sectional view taken along a line B-B' of the second lens driving mechanism shown in FIG. 4.

The second lens driving mechanism will be described in further detail below with reference to FIGS. 4 and 5. FIG. 4 shows an arrangement example of a piezoelectric vibration motor 21 and a transmission gear 22, which are arranged on a wall 23. FIG. 5 is a sectional view taken along a line B-B' in FIG. 4.

FIG. 4 shows that a vibrator 24 of the piezoelectric vibration motor is arranged at the end of the transmission gear 22. By arranging the vibrator 24 of the piezoelectric vibration motor at a position apart from the center of the transmission gear 22, a rotor shaft 25 can be smoothly rotated.

As shown in FIG. 5, the transmission gear 22 and a toothed gear 26 are respectively coupled to one end side and the other end side of the rotor shaft 25. A thrust bearing 27 is arranged in contact with the transmission gear 22, and a bearing 28 is provided inside a cover 29 for preventing a thrust bearing rotating ring from falling off. The piezoelectric vibration motor 21 is arranged inside a piezoelectric vibration motor holder 30. The vibrator 24 of the piezoelectric vibration motor is in contact with a plane portion of the transmission gear 22. The piezoelectric vibration motor 21 is vibrated with the vibrator 24 of the piezoelectric vibration motor being vertically pressed in an urged state against the plane portion of the transmission gear 22, so that the transmission gear 22 is rotated. The transmission gear 22 can be smoothly rotated by contacting the thrust bearing 27. In the second lens driving mechanism according to the present invention, when the transmission gear 22 is rotated, the toothed gear 26 coupled to the other end side of the rotor shaft 25 is rotated, and the motor power transmission ring meshing with the toothed gear 26 is also rotated. Accordingly, the lens driving ring is rotationally driven.

Figure 6:
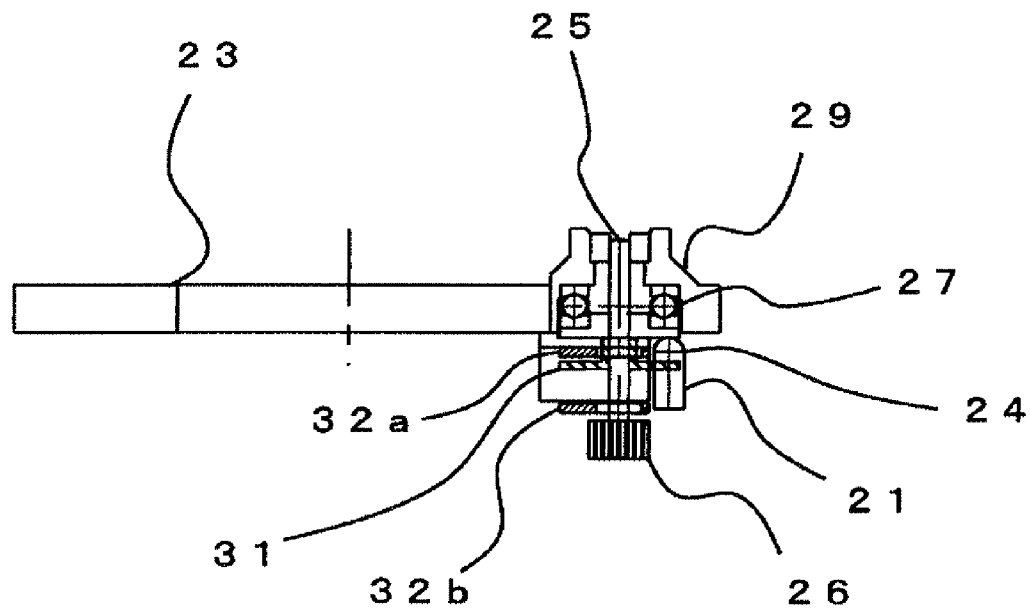
FIG. 6 is a sectional view taken along a line B-B' of the second lens driving mechanism (using a magnet) shown in FIG. 4.
Figure 7:
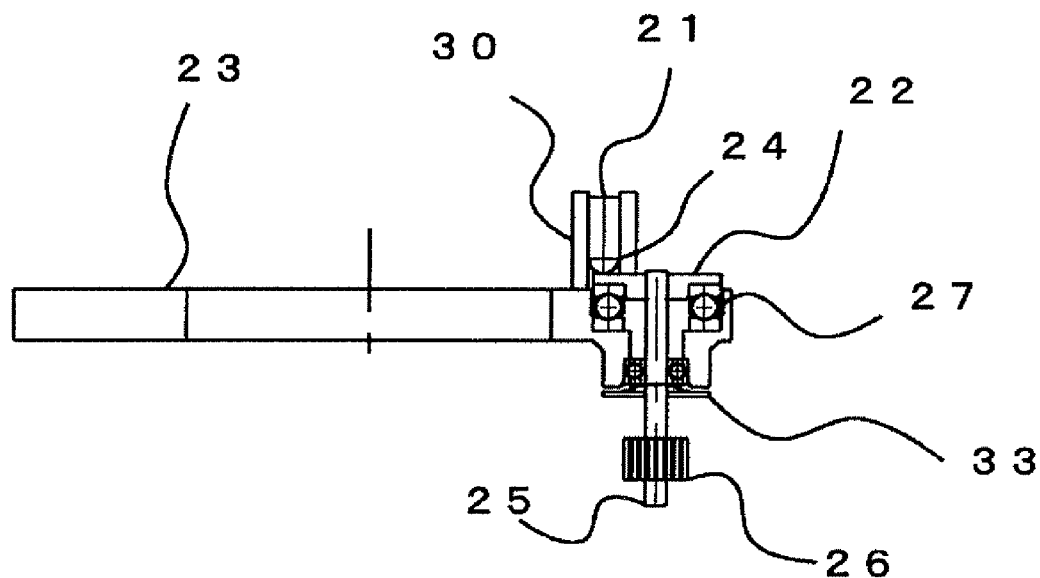
FIG. 7 is a sectional view taken along a line B-B' of the second lens driving mechanism (using a spring) shown in FIG. 4.

FIGS. 6 and 7 show other embodiments of the second lens driving mechanism according to the present invention. FIG. 6 shows a configuration in which play in the thrust bearing 27 is eliminated by use of the attractive force of a magnet to perform stable operation. FIG. 7 shows a configuration in which play in the thrust bearing 27 is eliminated by use of the repulsive force of a leaf spring to perform stable operation. The embodiments will be described in detail below with reference to FIGS. 6 and 7.

The second lens driving mechanism according to the present invention preferably includes a magnet mechanism around the transmission gear 22 to perform stable operation by pressing the transmission gear 22 against the thrust bearing 27. FIG. 6 shows an arrangement example of the thrust bearing 27, the transmission gear 22, the piezoelectric vibration motor 21, magnets 32a and 32b, a magnetic element 31 to be attracted by the magnet, and the toothed gear 26. As shown in FIG. 6, the cover 29 for preventing a thrust bearing rotating ring from falling off is formed to cover the thrust bearing 27, and the vibrator 24 of the piezoelectric vibration motor is vertically arranged in contact with the plane portion of the transmission gear 22 that is in contact with the thrust bearing 27. In the second lens driving mechanism shown in FIG. 6, the magnet 32a attracts the magnetic element 31 to be attracted by the magnet by the magnetic force, to hold the thrust bearing 27. The play in the rotating ring of the thrust bearing 27 is thereby eliminated, and the thrust bearing 27 is stably operated. Also, by using the magnet 32b and the toothed gear 26 as a magnetic element to be attracted by the magnet, the play in the rotating ring of the thrust bearing 27 is eliminated, and the thrust bearing 27 is stably operated in a similar manner as described above. Here, the magnet 32a and the magnet 32b may be used separately or in combination.

The second lens driving mechanism according to the present invention preferably includes a spring mechanism around the transmission gear 22 to perform stable operation by pressing the thrust bearing 27 against the transmission gear 22. FIG. 7 shows an arrangement example of the thrust bearing 27, the transmission gear 22, the piezoelectric vibration motor 21, a leaf spring 33, and the toothed gear 26. As shown in FIG. 7, the cover 29 for preventing a thrust bearing rotating ring from falling off is formed to cover the thrust bearing 27, and the vibrator 24 of the piezoelectric vibration motor is vertically arranged in contact with the plane portion of the transmission gear 22 that is in contact with the thrust bearing 27. In the second lens driving mechanism shown in FIG. 7, the thrust bearing 27 is held by being pressed toward the piezoelectric vibration motor 21 by use of the repulsive force of the leaf spring 33. The play in the rotating ring of the thrust bearing 27 is thereby eliminated, and the thrust bearing 27 is stably operated.

The second lens driving mechanism is not limited to the embodiments shown in the drawings. For example, the configurations shown in FIGS. 5 to 7 may be arranged on the same wall.

In the first or second lens driving mechanism according to the present invention, an encoder wheel that rotates in synchronization with the rotation of the transmission gear 2 or 22 is preferably arranged outside the wall 5 or 23. By transmitting the torque of the rotor shaft to the encoder wheel without using multiple gears, the moving accuracy of a lens is improved.

The transmission gear in the first and second lens driving mechanisms according to the present invention is preferably made of ceramic material, or stainless-steel material having a hardness of HV900 or more. When the transmission gear is made of ceramic material, or stainless-steel material having a hardness of HV900 or more, the durability is increased and the quality as a lens driving apparatus can be improved.

Third lens driving mechanism: The third lens driving mechanism according to the present invention is a lens driving mechanism for directly transmitting the vibration of the piezoelectric vibration motor as the driving source to the lens driving ring connected to the motor power transmission ring, and thereby rotating the motor power transmission ring and the lens driving ring in synchronization. One or more piezoelectric vibration motors are arranged on the outer periphery of the lens driving ring with a vibrator of each of the piezoelectric vibration motors being directly pressed in an urged state against the outer periphery.

The third lens driving mechanism will be described in further detail below with reference to FIGS. 8 to 12.

Figure 8:
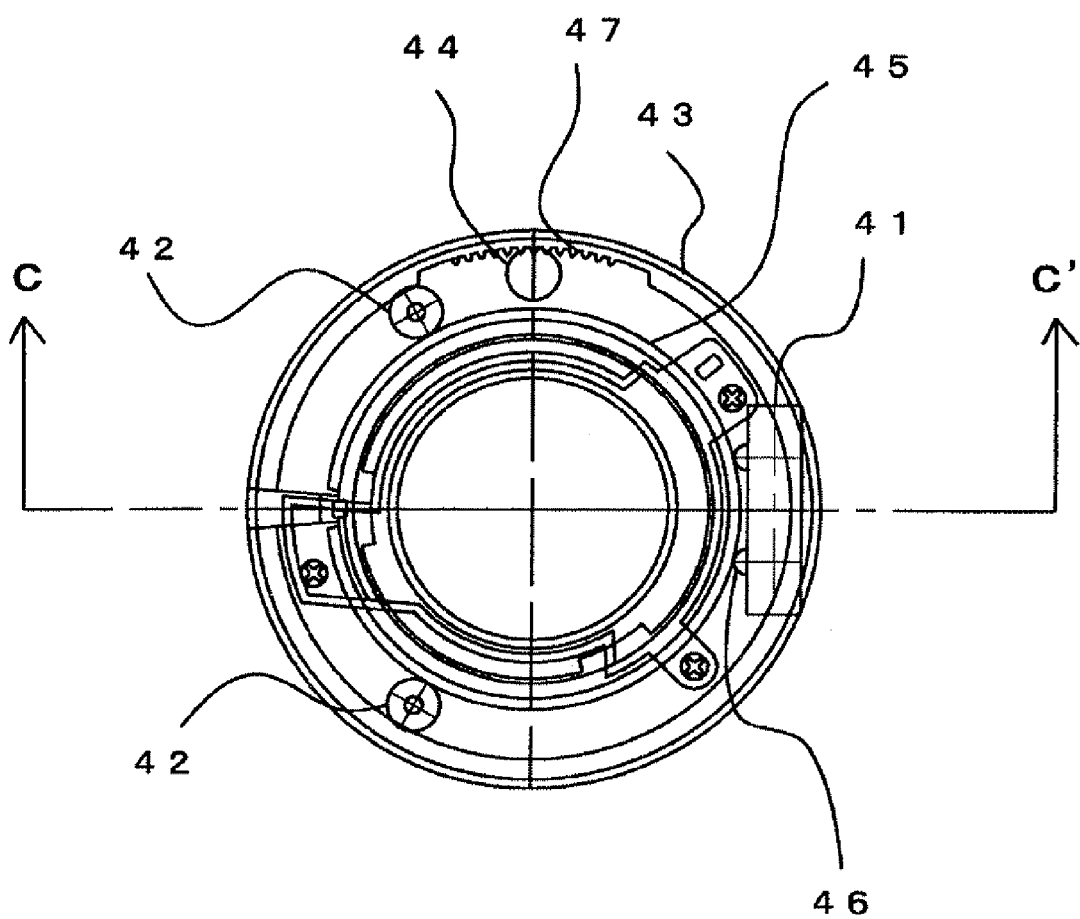
FIG. 8 is a plan view showing an embodiment of a third lens driving mechanism according to the present invention.

FIG. 8 shows an arrangement example of a lens driving ring 45, a piezoelectric vibration motor 41, and guide rollers 42. As shown in FIG. 8, the vibration of the piezoelectric vibration motor 41 is directly transmitted to rotate the lens driving ring with a vibrator 46 of the piezoelectric vibration motor being directly pressed in an urged state against the outer peripheral surface of the lens driving ring 45. Here, the guide rollers 42 are arranged on the outer peripheral surface of the lens driving ring 45 in order to prevent the lens driving ring 45 from deviating from a center position by being urged by the vibrator 46 of the piezoelectric vibration motor. In the third lens driving mechanism according to the present invention, the lens driving ring 45 is directly rotated by the vibration of the piezoelectric vibration motor 41, and a motor power transmission ring 43 is thereby rotated. A gear meshing portion 47 is provided on the inner peripheral surface of the motor power transmission ring 43. When the motor power transmission ring 43 is rotated, an encoder (not shown) is rotated via a toothed gear 44 meshing with the gear meshing portion 47.

Figure 9:
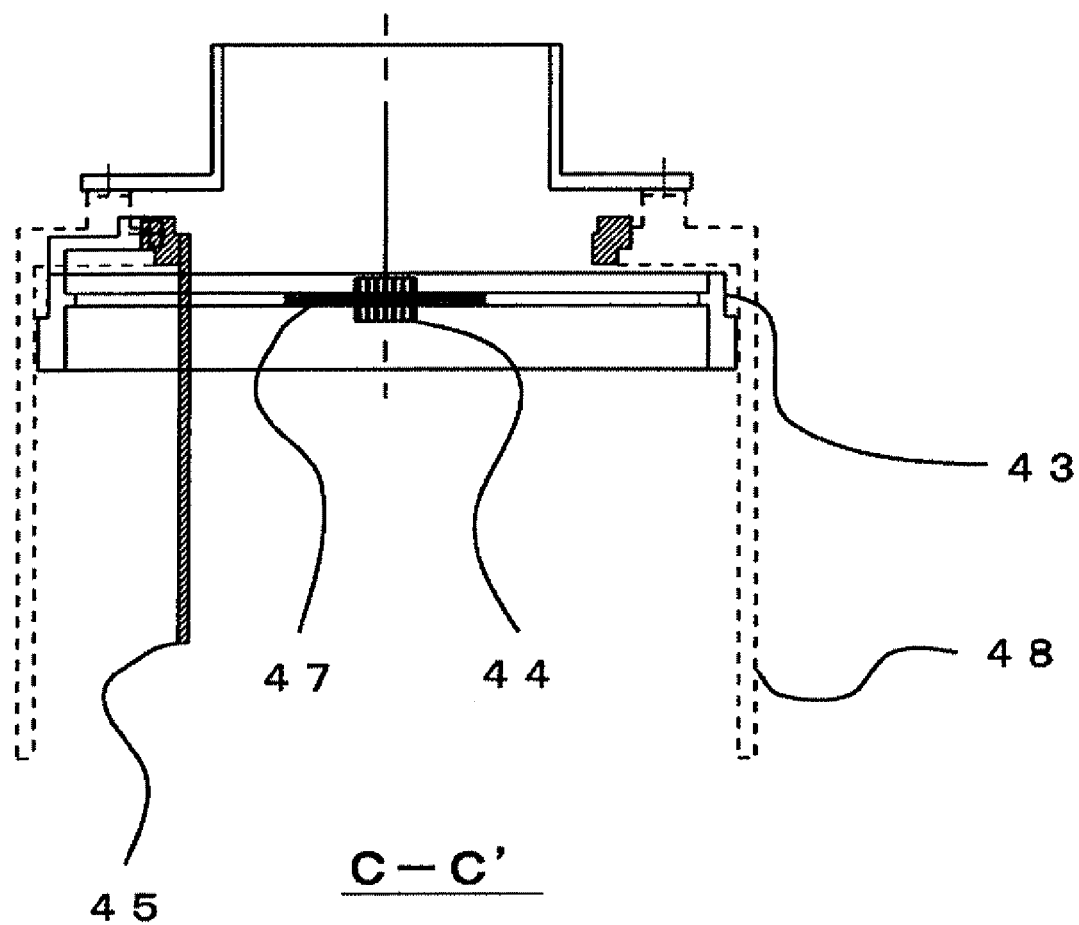
FIG. 9 is a sectional view taken along a line C-C' of the third lens driving mechanism shown in FIG. 8.
Figure 10:
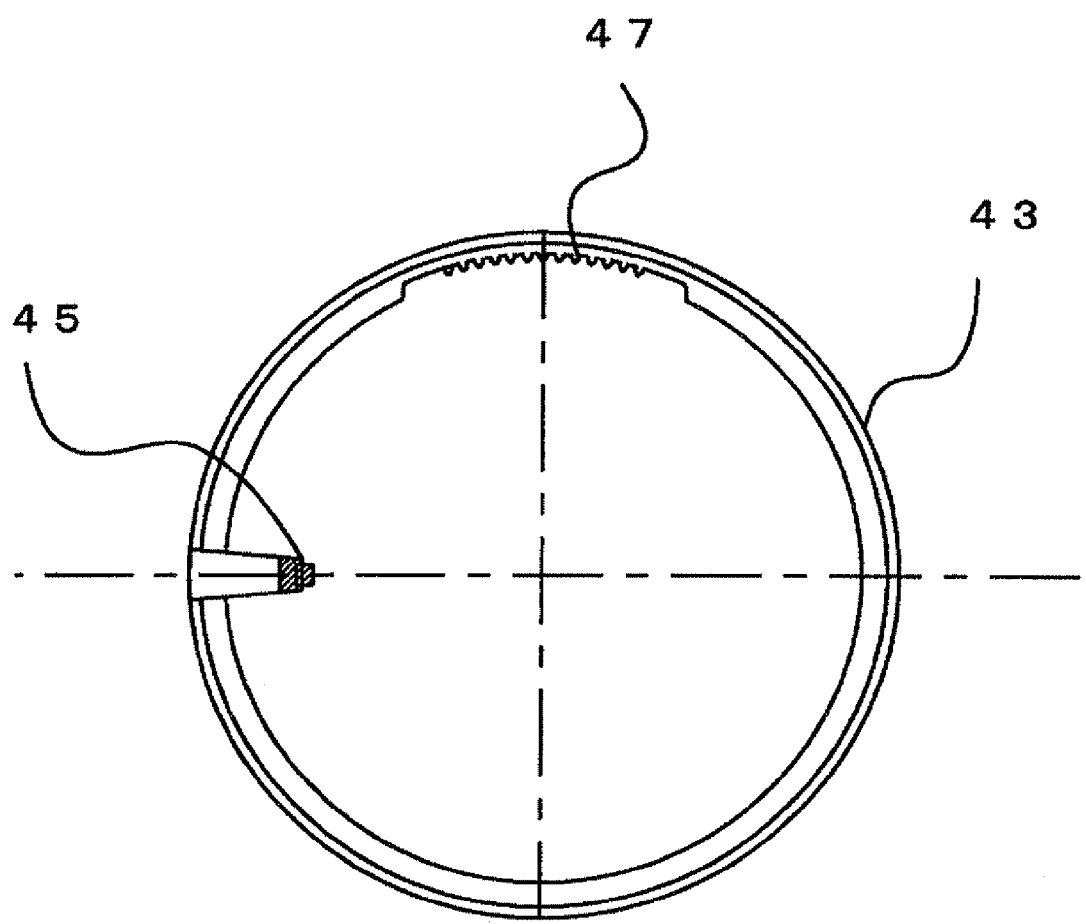
FIG. 10 is a plan view of a configuration of a lens driving ring and a motor power transmission ring of the third lens driving mechanism according to the present invention.
Figure 11:
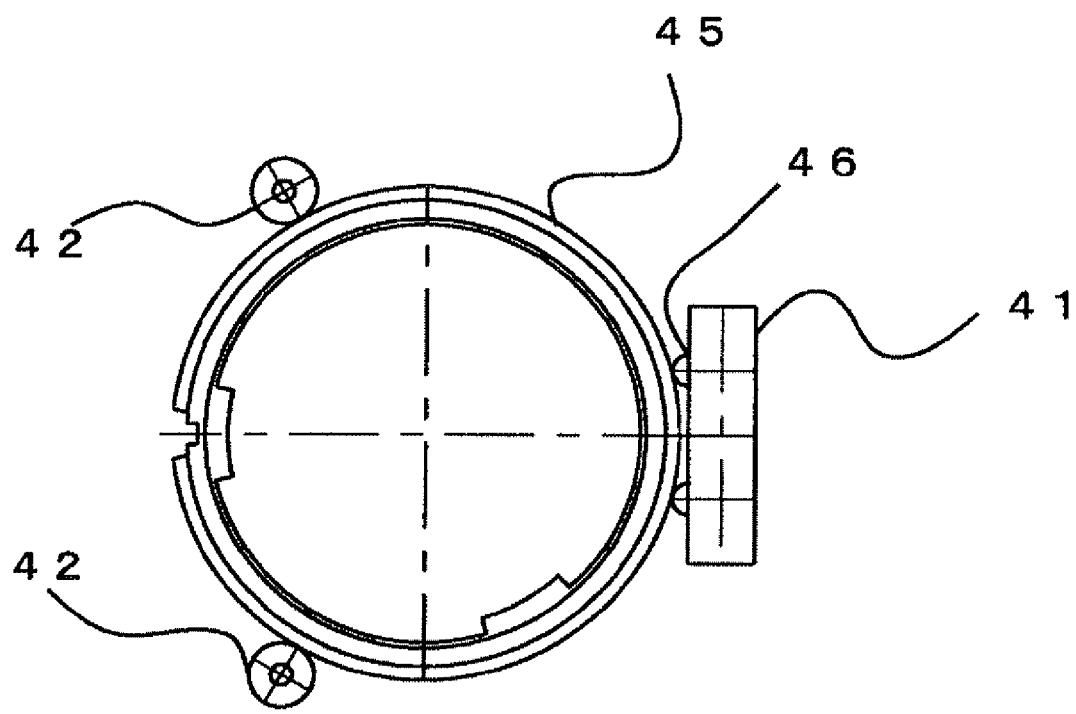
FIG. 11 is a plan view showing an arrangement example of one piezoelectric vibration motor of the third lens driving mechanism according to the present invention.

FIG. 9 is a sectional view taken along a line C-C' in FIG. 8. As shown in FIG. 9, the lens driving ring 45 and the motor power transmission ring 43 are connected inside a lens barrel 48, and the toothed gear 44 is arranged meshing with the gear meshing portion 47 on the inner peripheral surface of the motor power transmission ring 43. FIG. 10 is a plan view showing an arrangement example of the lens driving ring 45 and the motor power transmission ring 43. The lens driving ring 45 and the motor power transmission ring 43 are connected at a position shown in FIG. 10. FIG. 11 shows an arrangement example of the piezoelectric vibration motor 41, the lens driving ring 45, and the guide rollers 42. As shown in FIG. 11, the vibrator 46 of the piezoelectric vibration motor and the guide rollers 42 are arranged in contact with the outer peripheral surface of the lens driving ring 45.

In the third lens driving mechanism according to the present invention, the piezoelectric vibration motor 41 is vibrated with the vibrator 46 of the piezoelectric vibration motor being urged in contact with the lens driving ring 45, and the lens driving ring 45 is thereby directly rotated as shown in FIG. 11. Here, when the lens driving ring 45 is rotated, the motor power transmission ring 43 is also rotated.

The third lens driving mechanism preferably has a configuration in which one or more guide rollers are arranged on the outer periphery of the lens driving ring 45, to prevent the lens driving ring 45 from deviating from the center position with the vibrator of the piezoelectric vibration motor being pressed in an urged state. As shown in FIG. 11, the guide roller 42 functions as a stopper for preventing the lens driving ring 45 from deviating from the center position by being urged by the vibrator 46 of the piezoelectric vibration motor.

Figure 12:
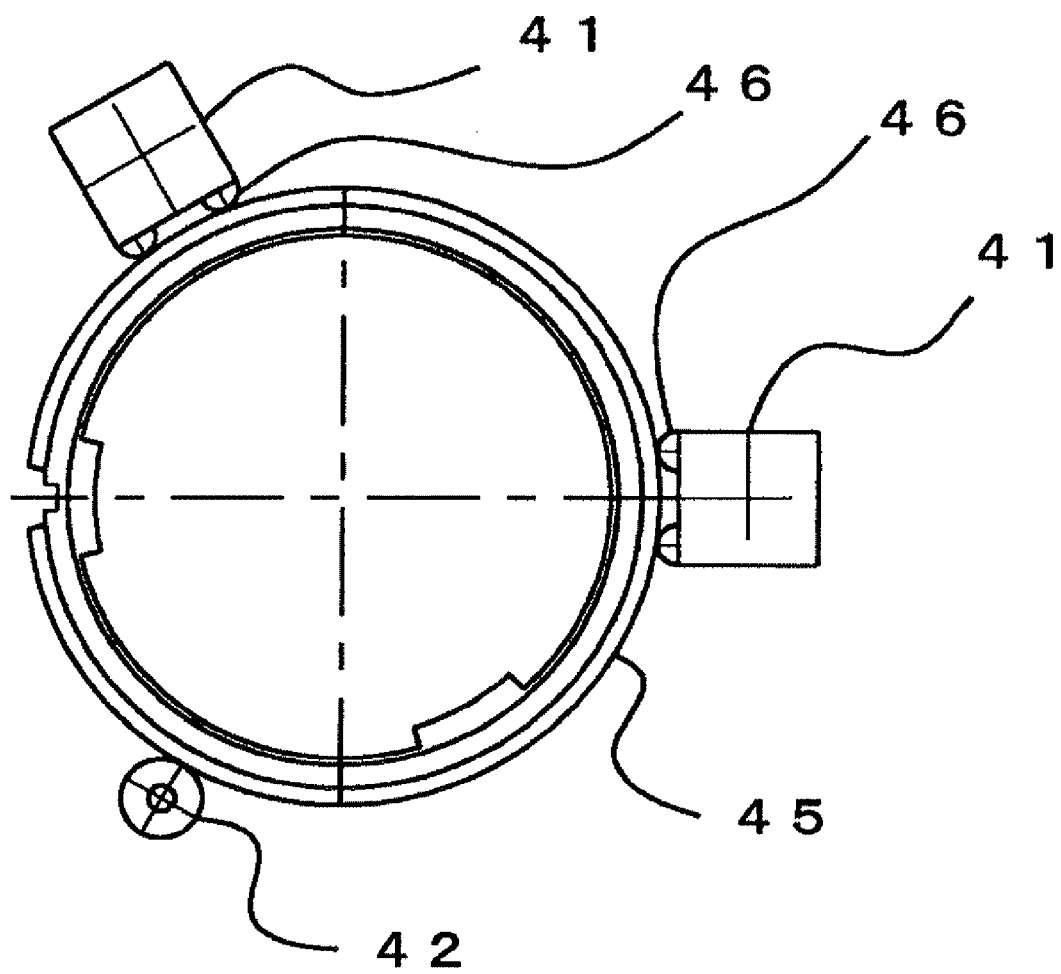
FIG. 12 is a plan view showing an arrangement example of two piezoelectric vibration motors of the third lens driving mechanism according to the present invention.

FIG. 12 shows an arrangement example of two piezoelectric vibration motors 41, the lens driving ring 45, and the guide roller 42. As shown in FIG. 12, the vibrators 46 of the piezoelectric vibration motors and the guide roller 42 are arranged in contact with the outer peripheral surface of the lens driving ring 45 in a similar manner to FIG. 11. Although the embodiments of the third lens driving mechanism are shown in FIGS. 11 and 12, the third lens driving mechanism is not limited to the embodiments shown in the drawings. For example, three or more piezoelectric vibration motors 41 may be used.

Furthermore, in the third lens driving mechanism according to the present invention, the piezoelectric vibration motor may be vibrated with the vibrator of the piezoelectric vibration motor being pressed in an urged state against the motor power transmission ring, not the lens driving ring, to rotate the motor power transmission ring, and also rotate the lens driving ring connected to the motor power transmission ring. Here, the guide roller functions as a stopper for preventing the lens driving ring from deviating from the center position with the vibrator of the piezoelectric vibration motor being pressed in an urged state.

By using the first to third lens driving mechanisms described above, an image pickup apparatus having an excellent imaging quality can be provided.

It is an object of the present embodiments to provide a lens driving mechanism capable of being reduced in size, and having excellent lens driving accuracy and tranquility. The mechanism which achieves the above object and a mechanism of a conventional example are compared in the following.

Figure 13:
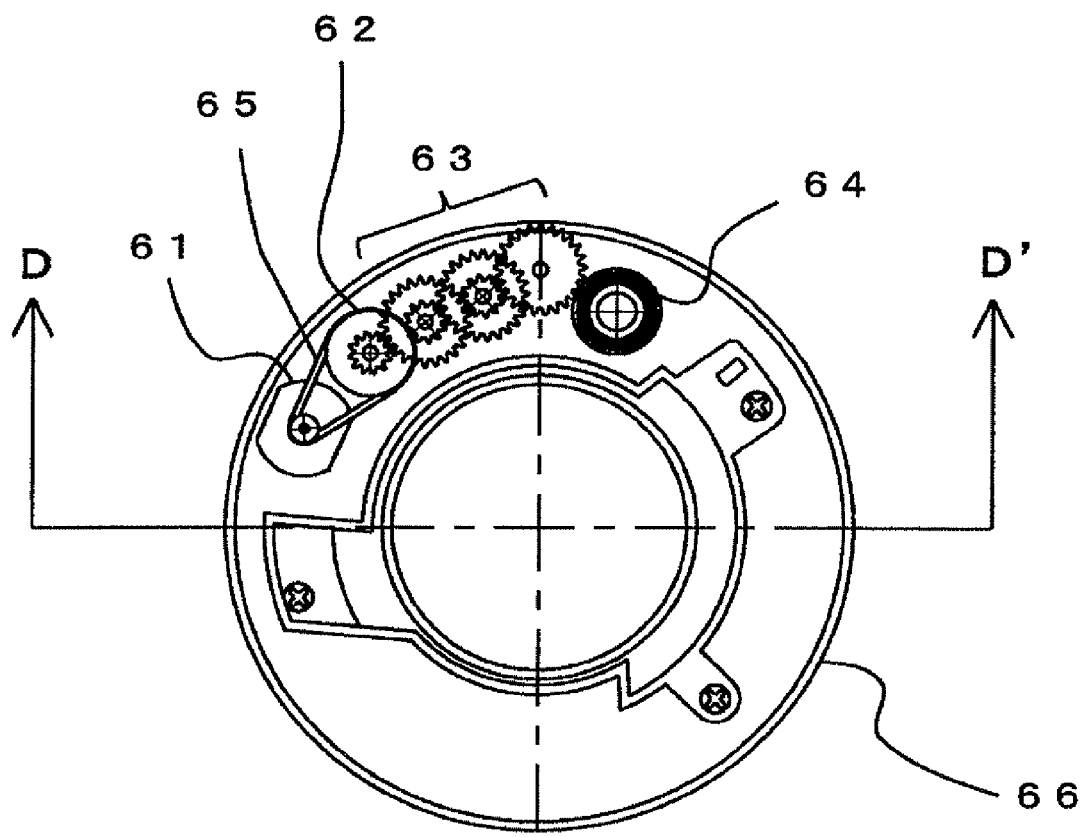
FIG. 13 is a plan view showing an example of an embodiment related to a conventional lens driving mechanism.

FIG. 13 shows an arrangement example of a DC motor 61, a transmission gear 62, gears 63, and an encoder 64, which are arranged on a wall 66. As shown in FIG. 13, a drive shaft of the DC motor 61 and the transmission gear 62 are connected via a transmission belt 65, and the transmission gear 62 and the encoder wheel 64 mesh with each other via the gears 63. The conventional lens driving mechanism differs from the lens driving mechanism according to the present invention in that the conventional lens driving mechanism includes the DC motor as a power transmission source, and the multiple gears are arranged to transmit a driving force to the encoder. The DC motor structurally has a mechanical contact point between brushes and a commutator, by which such problems as sparks generated by commutation, noise occurring during rotation, and reduction in operating life could be caused. Also, noise could occur when the DC motor is controlled by a microcomputer. Furthermore, when the DC motor is used, the multiple gears are required. Using the multiple gears causes increase in system size, noise occurring during gear rotation, and decrease in lens moving accuracy.

Figure 14:
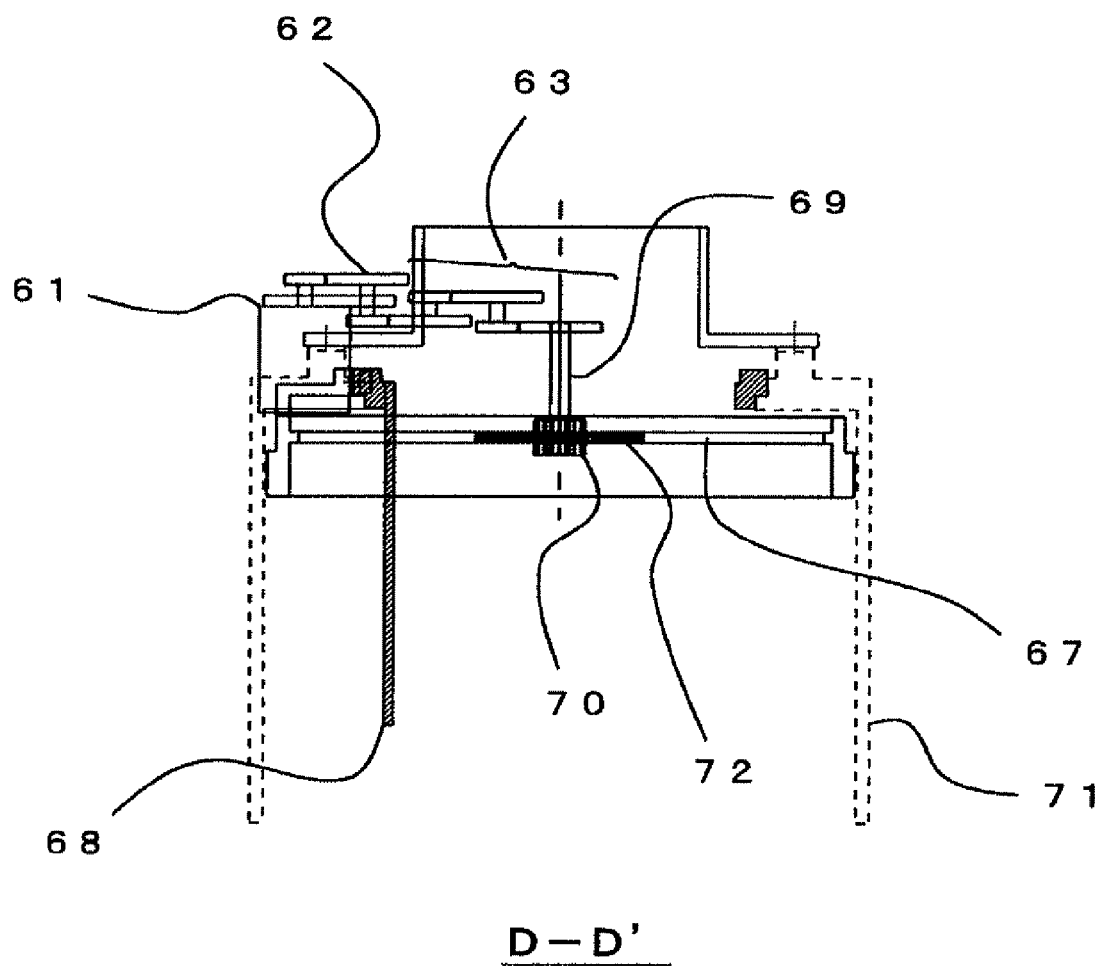
FIG. 14 is a sectional view taken along a line D-D' of the lens driving mechanism shown in FIG. 13.

FIG. 14 is a sectional view taken along a line D-D' in FIG. 13. FIG. 14 shows an arrangement example of the transmission gear 62, the gears 63, a lens driving ring 68, a rotor shaft 69, and a toothed gear 70 in a lens barrel 71. As shown in FIG. 14, a gear of the gears 63 is coupled to one end side of the rotor shaft 69, and the toothed gear 70 is coupled to the other end side of the rotor shaft 69. The driving force of the motor is transmitted to rotate the toothed gear 70, and a motor power transmission ring 67 meshing with the toothed gear 70 is also rotated. The lens driving ring 68 connected to the ring 67 is thereby rotationally driven. When FIG. 14 showing the embodiment of the conventional lens driving mechanism and FIG. 9 showing the lens driving mechanism according to the present invention are compared, the conventional lens driving mechanism obviously has a more complicated system. That is, according to the present invention, the lens driving mechanism has a simplified system and can be reduced in size.

From the comparison result with the conventional lens driving mechanism described above, when the lens driving mechanism according to the present invention is used for an image pickup apparatus, the problems in using the DC motor are solved since the vibration of the piezoelectric vibration motor is employed as the driving source. Furthermore, since the multiple gears are not required, the problems of increase in system size, noise and lens moving accuracy are also solved.

By using the lens driving mechanism according to the present invention for an image pickup apparatus, an image pickup apparatus capable of being reduced in size, and having excellent lens moving accuracy and tranquility can be provided.

What is claimed is:

1. A lens driving mechanism for transmitting power generated from a driving source to a motor power transmission ring housed in a lens barrel, and thereby rotationally driving a lens driving ring attached to the motor power transmission ring, wherein vibration generated at a vibrator protruded at a part of a piezoelectric vibration motor is used as the driving source, and the vibration is transmitted to the motor power transmission ring directly or via a gear structure, to rotationally drive the lens driving ring.

2. The lens driving mechanism according to claim 1, for transmitting the vibration of the piezoelectric vibration motor as the driving source to the motor power transmission ring via a gear structure, and thereby rotationally driving the lens driving ring, wherein the gear structure comprises: a through hole provided in a wall extending parallel to the motor power transmission ring; a rotor shaft penetrating through the through hole; a first transmission gear provided on one end side of the rotor shaft projecting outside the wall; and a toothed gear provided on the other end side of the rotor shaft that is on the motor power transmission ring side, the toothed gear transmitting a driving force to a gear meshing portion formed on an inner periphery of the motor power transmission ring; and by rotating the first transmission gear by use of the vibration of the piezoelectric vibration motor, the rotor shaft is rotated and the toothed gear on the other end side is also rotated, to thereby rotate the motor power transmission ring.

3. The lens driving mechanism according to claim 2, wherein a second transmission gear is provided on the wall between a vibrator of the piezoelectric vibration motor and the first transmission gear, the second transmission gear being rotated by the vibration of the piezoelectric vibration motor, and the first transmission gear being rotated by torque thereof.

4. The lens driving mechanism according to claim 2, wherein an encoder wheel rotating in synchronization with rotation of the transmission gear is provided outside the wall.

5. The lens driving mechanism according to claim 2, wherein the transmission gear is made of ceramic material.

6. The lens driving mechanism according to claim 2, wherein the transmission gear is made of stainless-steel material having a hardness of HV900 or more.

7. The lens driving mechanism according to claim 1, for transmitting the vibration of the piezoelectric vibration motor as the driving source to the motor power transmission ring via a gear structure, and thereby rotationally driving the lens driving ring, wherein the gear structure comprises: a through hole provided in a wall extending parallel to the motor power transmission ring; a rotor shaft penetrating through the through hole; a transmission gear provided on one end side of the rotor shaft projecting outside the wall; a toothed gear provided on the other end side of the rotor shaft that is on the motor power transmission ring side, the toothed gear transmitting a driving force to a gear meshing portion formed on an inner periphery of the motor power transmission ring; a thrust bearing provided on the transmission gear side; and a bearing provided on the toothed gear side;

a vibrator of the piezoelectric vibration motor is vertically pressed in an urged state against a plane of the transmission gear projecting outside the wall, the transmission gear is directly rotated by the vibration of the piezoelectric vibration motor, and by torque thereof, the rotor shaft is rotated and the toothed gear on the other end side is also rotated, to thereby rotate the motor power transmission ring.

8. The lens driving mechanism according to claim 7, wherein a magnet mechanism is provided around the transmission gear to perform stable operation by pressing the transmission gear against the thrust bearing.

9. The lens driving mechanism according to claim 7, wherein a spring mechanism is provided around the transmission gear to perform stable operation by pressing the thrust bearing against the transmission gear.

10. The lens driving mechanism according to claim 7, wherein an encoder wheel rotating in synchronization with rotation of the transmission gear is provided outside the wall.

11. The lens driving mechanism according to claim 7, wherein the transmission gear is made of ceramic material.

12. The lens driving mechanism according to claim 7, wherein the transmission gear is made of stainless-steel material having a hardness of HV900 or more.

13. The lens driving mechanism according to claim 1, for directly transmitting the vibration of the piezoelectric vibration motor as the driving source to the lens driving ring connected to the motor power transmission ring, and thereby rotating the motor power transmission ring and the lens driving ring in synchronization, wherein one or more piezoelectric vibration motors are arranged on an outer periphery of the lens driving ring with a vibrator of each of the piezoelectric vibration motors being directly pressed in an urged state against the outer periphery.

14. The lens driving mechanism according to claim 13, wherein one or more guide rollers are provided on the outer periphery of the lens driving ring, to adjust a center position of the lens driving ring against which the vibrator of each of the piezoelectric vibration motors is pressed in an urged state.

15. A lens driving mechanism for transmitting power generated from a driving source to a motor power transmission ring housed in a lens barrel, and thereby rotationally driving a lens driving ring attached to the motor power transmission ring, wherein vibration of a piezoelectric vibration motor is used as the driving source, and the vibration is transmitted to the motor power transmission ring directly or via a gear structure, to rotationally drive the lens driving ring;

wherein the gear structure comprises: a through hole provided in a wall extending parallel to the motor power transmission ring; a rotor shaft penetrating through the through hole; a first transmission gear provided on one end side of the rotor shaft projecting outside the wall; and a toothed gear provided on the other end side of the rotor shaft that is on the motor power transmission ring side, the toothed gear transmitting a driving force to a gear meshing portion formed on an inner periphery of the motor power transmission ring; and by rotating the first transmission gear by use of the vibration of the piezoelectric vibration motor, the rotor shaft is rotated and the toothed gear on the other end side is also rotated, to thereby rotate the motor power transmission ring.

16. The lens driving mechanism according to claim 15, wherein a second transmission gear is provided on the wall between a vibrator of the piezoelectric vibration motor and the first transmission gear, the second transmission gear being rotated by the vibration of the piezoelectric vibration motor, and the first transmission gear being rotated by torque thereof.

17. The lens driving mechanism according to claim 15, wherein an encoder wheel rotating in synchronization with rotation of the transmission gear is provided outside the wall.

18. The lens driving mechanism according to claim 15, wherein the transmission gear is made of ceramic material.

19. The lens driving mechanism according to claim 15, wherein the transmission gear is made of stainless-steel material having a hardness of HV900 or more.

* * * * *